Patented Jan. 10, 1933

1,893,611

UNITED STATES PATENT OFFICE

THEODORE F. BRADLEY, OF WESTFIELD, NEW JERSEY, ASSIGNOR TO AMERICAN CYANAMID COMPANY, OF NEW YORK, N. Y., A CORPORATION OF MAINE

WRINKLED FINISH COATING

No Drawing.  Application filed February 20, 1931. Serial No. 517,316.

This invention relates to wrinkled finished coatings and methods of obtaining same.

In the past, certain ornamental coating effects have been obtained, known as wrinkled finishes. Compositions suitable for this purpose have been described as varnishes containing drying oils, resins, driers and volatile solvents of the usual type, the compositions being characterized by their high solid contents, very volatile solvents, and suitable proportions of oxidizable oils and driers. The wrinkled finish results from the extremely rapid volatilization of solvent and surface oxidation, and requires that the initial thickness of the film be such that the underlying portion of the film remains fairly fluid while the surface rapidly oxidizes to a solid state. Finally the whole film becomes hardened by oxidation, but during this period such stresses and strains occur that the finish becomes wrinkled. This effect is accelerated by the drying at elevated temperatures.

In order to secure wrinkled finishes of requisite hardness, it has been necessary to employ various resins in the manufacture of the varnishes to be used for this purpose. Ordinarily, Congo gum or some other natural hard resin is used. However, these natural resins cause considerable darkening and discoloration of the compositions and in the resulting finish. The dark color is especially undesirable for many purposes. Further, the prior art wrinkled finishes do not have sufficient durability or speed of drying, and are lacking in other respects.

I have discovered that far superior wrinkled finishes may be obtained by utilizing a composition comprising as its principal film-forming ingredient, a synthetic resin of the polybasic acid-polyhydric alcohol type, which resin has been modified by having combined therewith, the fatty acids of drying oils. It is to be noted that the resins which are used are actual chemical combinations of the three ingredients, as differentiated from oil varnishes containing polybasic acid-polyhydric alcohol resins dissolved therein, since my compositions are preferably free of any substantial proportion of oil, per se.

The following specific examples are given merely by way of illustration and not in limitation. A suitable synthetic varnish base may be prepared by heating together the following ingredients:

Example 1.

| | Parts by weight |
|---|---|
| Glycerol | 75 |
| Phthalic anhydride | 148 |
| Linseed oil fatty acids | 85 |
| Tung oil | 85 |

This mixture is heated at a temperature of about 230–250° C. for a period of about one-half to one hour, until a sample on cooling yields a non-sticky or only very slightly sticky mass. The heating operation is preferably carried out in a non-oxidizing atmosphere such as may be obtained by passing a stream of carbon dioxide or nitrogen or the like through or over the reaction mass.

When the reaction is complete, the resin composition is cooled to about 150° C. and is thinned with coal-tar naphtha (boiling point 160–200° C.) until a solution is obtained containing about 40% resin. A liquid drier such as linoleate, or resinate, is added in amounts sufficient to give a metallic cobalt equivalent of about 0.02 to 0.1%, based on the weight of resin. The solution is then ready for use and may be applied to a surface in any suitable manner, such as by brushing or flowing the solution thereon. The coating is preferably heated to a temperature of about 100° C. for one hour, whereupon there is obtained a light colored adherent film, having a wrinkled finish and being of superior hardness and durability, and being substantially insoluble in the usual solvents.

The following are other examples of typical resins and compositions suitable for producing the desired wrinkled finish.

Example 2

| | Parts by weight |
|---|---|
| Glycerol | 100 |
| Phthalic anhydride | 160 |
| Linseed fatty acids | 110 |

This mixture was reacted as in Example 1, for a period of about 45 minutes. The resin obtained had an acid number of 14.0 and had a softening point of 56° C. This resin was dissolved in toluene to make a 40% solution, and to 50 parts of this solution were added respectively ½ part of each of a 25% solution of a lead naphthenate drier and a cobalt naphthenate drier. This composition is applied and dried as described before or in any other suitable manner.

*Example 3*

| | Parts by weight |
|---|---|
| Glycerol | 100 |
| Phthalic anhydride | 160 |
| Linseed fatty acids | 130 |

This mixture was reacted as before described for a period of about 80 minutes. There was thus obtained a resin having an acid number of 11.2 and a softening point of about 53° C. This resin was also dissolved in toluene to make a 40% solution, to which were added small quantities of lead and manganese driers. This composition also served to give excellent wrinkled finishes.

It is obvious that other polyhydric alcohols may be used in place of all or a part of the glycerol. These include the various glycols, polyglycols, ether alcohols, pentaerythritol, polyglycerols and the like. Mixtures of these various bodies may likewise be employed. Further, various polycarboxylic acids, alone or in admixture, such as sebacic, adipic, etc., may be used to replace all or a part of the phthalic anhydride. It is to be understood that the anhydrides of the acids may be employed in place of the acids themselves. Likewise, the fatty acids combined in and modifying the resins may include the various unsaturated fatty acids such as those obtained from drying oils like linseed, perilla, tung, etc.

The degree of hardness and flexibility of the finished resin may be controlled by varying the ratio of the fatty acids to the polybasic acid and polyhydric alcohol. The physical properties of the resin are also affected by the nature of the oil acids used; thus, a resin prepared from the fatty acids of tung oil, is harder and more brittle than a similar resin prepared from linseed fatty acids. By proper selection of the proportions and amounts of fatty acids, any desirable type resin may be obtained.

It is also possible to employ the drying oils themselves in place of a part or all of the drying oil fatty acids. In the latter case, however, various expedients are usually adopted to obtain suitable combination of the oil with the other ingredients. One of such methods involves the use of rosin or other natural resin, or other suitable fluxing agent, to bring about chemical reaction and combination. Another method involves the "activation" of the drying oils by preliminarily heating them with either the polybasic acid or the polyhydric alcohol prior to the addition of the other component or components and final reaction. The use of glycols, polyglycols and other alcoholic bodies containing not more than two hydroxyl groups to the molecule, in place of more or less of the glycerol, also is of assistance in bringing about a combination of the drying oils themselves. The same results may also be obtained in some cases by using mixtures of drying oils and fatty acids, as shown in Example 1.

The resinous complexes obtained in any of the ways described are chemically of the nature of esters and are radically different from mere mixtures of a resin with a drying oil, since chemical combination is not known to occur in the latter case, even on heating.

The drying oils and/or their fatty acids may be employed in their raw or very liquid condition, or may be partially oxidized or polymerized prior to their use in the preparation of the synthetic resinous bodies utilized in this invention. Further, it has been found advantageous in some instances to heat the resins themselves in contact with air or oxygen for several hours, say at a temperature of about 100–125° C. This treatment serves to oxidize the resin partially and thereby produces a coating material which dries more rapidly than similar materials not treated in this manner. The pre-oxidation may be carried out by bubbling the oxygen-containing gas through the molten resin or by contacting the resin in powdered form, with the oxidizing medium.

The fatty acids and/or oils employed in modifying the resins may be varied widely in the group known as the oxidizable type. The ratio of oxidizable oils and/or fatty acids may also be varied within an extensive range as compared with the proportions of polyhydric alcohol and polybasic acid. In general, I prefer to use not less than 20% nor more than 80% of oxidizable fatty acids or their equivalent in the preparation of the synthetic varnish bases used in carrying out this invention.

These resins are dissolved or dispersed in suitable volatile organic solvents such as benzene, toluene, xylene, or mixtures thereof with volatile petroleum hydrocarbons. The addition of ethyl or butyl acetates, alcohol and like solvents, is in some cases permissable. For present purposes, it is desirable that the solvent or solvent mixture be of a highly volatile nature. The solid contents of the coating compositions may be varied from about 25 to 75% by weight, but generally a 40 to 50% concentration of the resin in solution is most satisfactory.

The addition of lead, cobalt or manganese resinates, naphthenates, linoleates, oleates, tungates, etc. in the form of solutions in volatile organic solvents is usually desirable but not always necessary to produce the desired type of finish. The driers may be used singly or in admixture and the proportions thereof may be varied considerably as is generally the practice in the paint and varnish industry. It is, however, generally unnecessary to employ more than 0.2% of actual catalytic metal based upon the weight of the resin used, this being especially true of the manganese and cobalt driers.

Compositions of the types described as suitable for giving wrinkled finishes, and especially those prepared from linseed oils or acids of initially pale color, are observed to give very pale-colored coatings which are much lighter in color than those heretofore obtainable with the usual type varnishes having an oil base and containing more or less resin or the like dissolved therein. Further, the drying qualities of the compositions used in the present invention, and the toughness and durability of the coatings obtained, are generally far superior to anything previously obtainable.

It will be evident that the invention is susceptible of many changes and variations other than those described, without departing from the spirit and scope thereof except as defined in the appended claims.

I claim:

1. The process of producing a wrinkled finish coating which comprises applying to an article, a coating composition containing a substantial proportion of a highly volatile solvent and as the essential base-forming ingredient, a resinous ester of polyhydric alcohol, a polybasic acid and fatty acids of a drying oil, and then drying the coating to produce rapid evaporation of the highly volatile solvent with consequent wrinkling of the coating.

2. The process of claim 1 in which the ester forms 25-75% of the composition.

3. The process of claim 1 in which the ester forms 40-50% of the composition.

4. The process of claim 1 in which the composition contains a drier.

5. The process of claim 1 in which the coating is dried at elevated temperatures.

6. The process of producing a wrinkled finish coating which comprises applying to an article, a coating composition containing a substantial proportion of a highly volatile solvent and as the essential base-forming ingredient, a resinous ester of a polyhydric alcohol, a polybasic acid and an oxidizable unsaturated fatty acid, and then drying the coating to produce rapid evaporation of the highly volatile solvent with consequent wrinkling of the coating.

7. The process of producing a wrinkled finish coating which comprises applying to an article, a coating composition containing a substantial proportion of a highly volatile solvent and as the essential base-forming ingredient, a resinous ester of a polyhydric alcohol, phthalic acid and fatty acids of a drying oil, and then drying the coating to produce rapid evaporation of the highly volatile solvent with consequent wrinkling of the coating.

8. The process of producing a wrinkled finish coating which comprises applying to an article, a coating composition containing a substantial proportion of a highly volatile solvent and as the essential base-forming ingredient, a resinous ester of glycerol, phthalic acid and fatty acids of a drying oil, and then drying the coating to produce rapid evaporation of the highly volatile solvent with consequent wrinkling of the coating.

9. The process of producing a wrinkled finish coating which comprises applying to an article, a coating composition containing a substantial proportion of a highly volatile solvent and as the essential base-forming ingredient, a resinous ester of glycerol, phthalic acid, and fatty acids of linseed oil, and then drying the coating to produce rapid evaporation of the highly volatile solvent with consequent wrinkling of the coating.

10. The process of producing a wrinkled finish coating which comprises applying to an article, a coating composition containing a substantial proportion of a highly volatile solvent and as the essential base-forming ingredient a resinous ester of glycerol, phthalic acid, and fatty acids of linseed and tung oils, and then drying the coating to produce rapid evaporation of the highly volatile solvent with consequent wrinkling of the coating.

In testimony whereof, I have hereunto subscribed my name this 18th day of February, 1931.

THEODORE F. BRADLEY.